July 18, 1967
A. J. WILSON
3,331,641
BRAKE CONTROL SYSTEM
Filed May 28, 1964
5 Sheets-Sheet 1
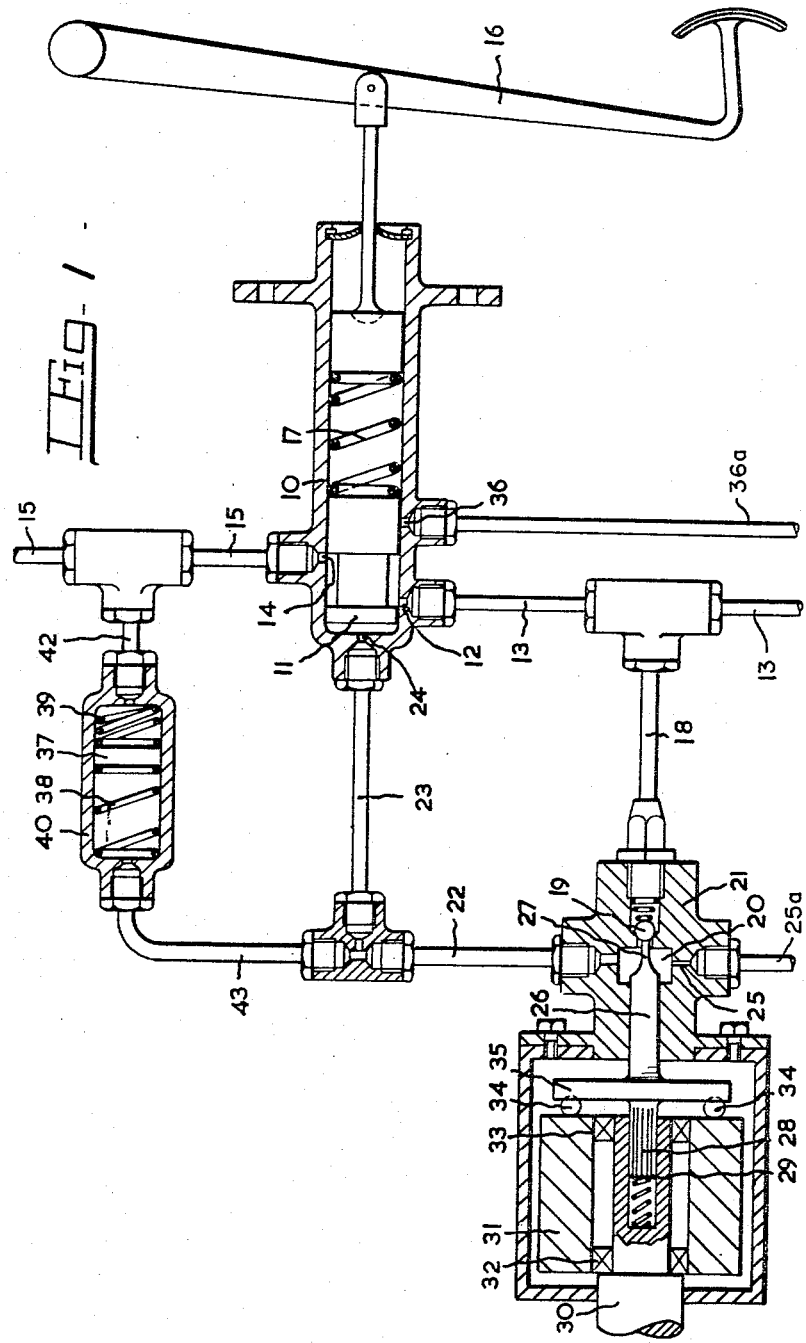
Alexander John Wilson
By Scrivener Parker Scrivener + Clarke

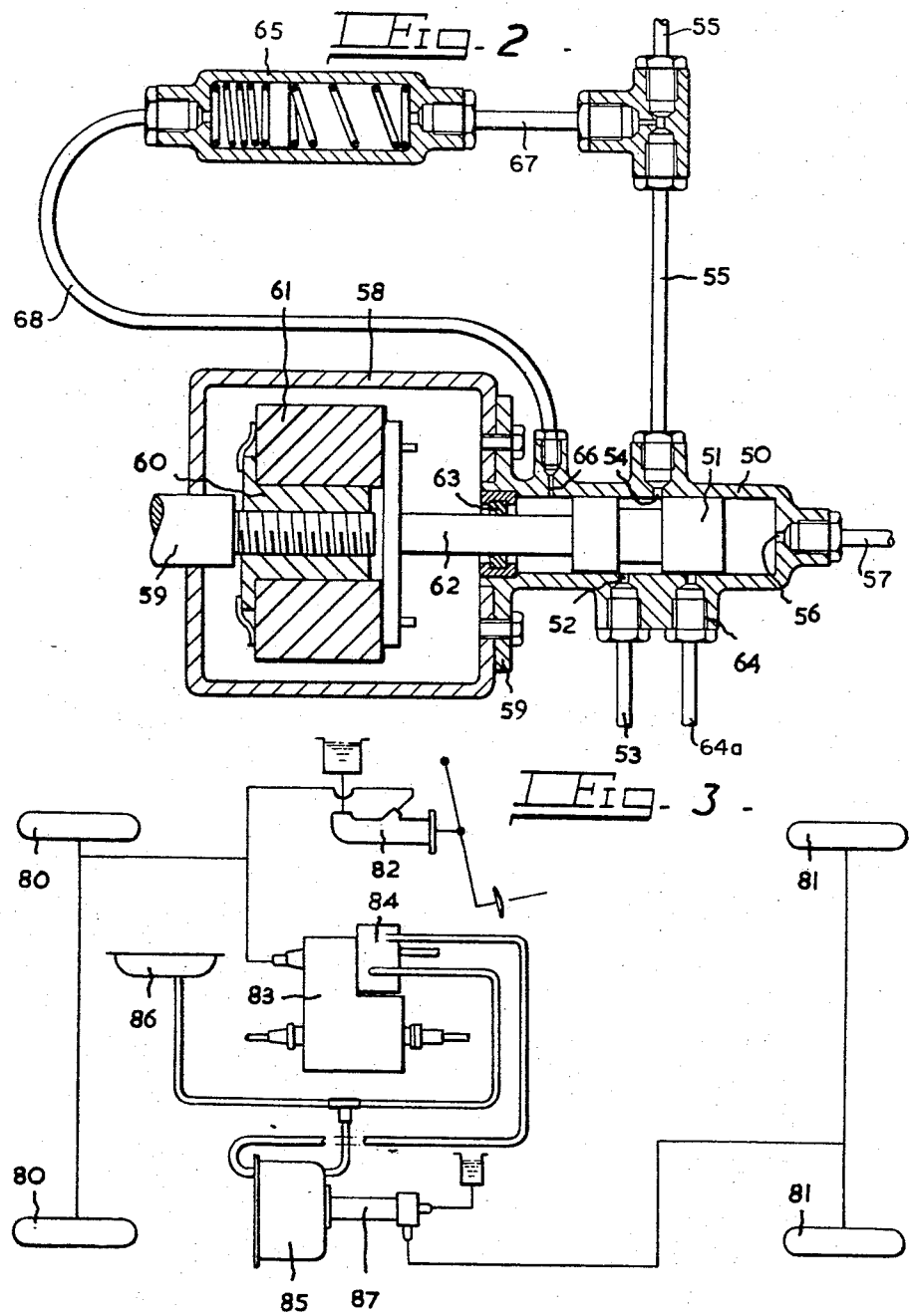

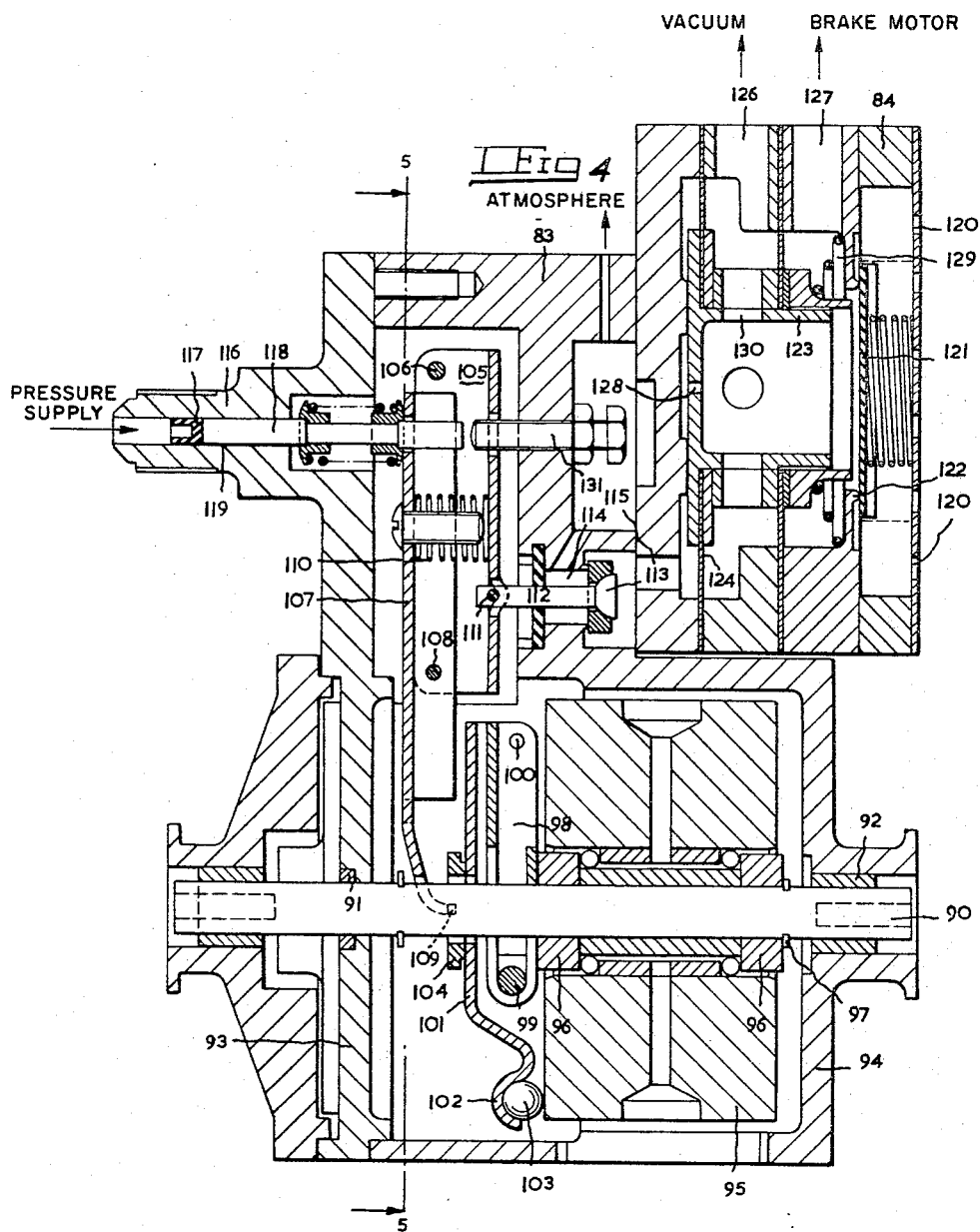

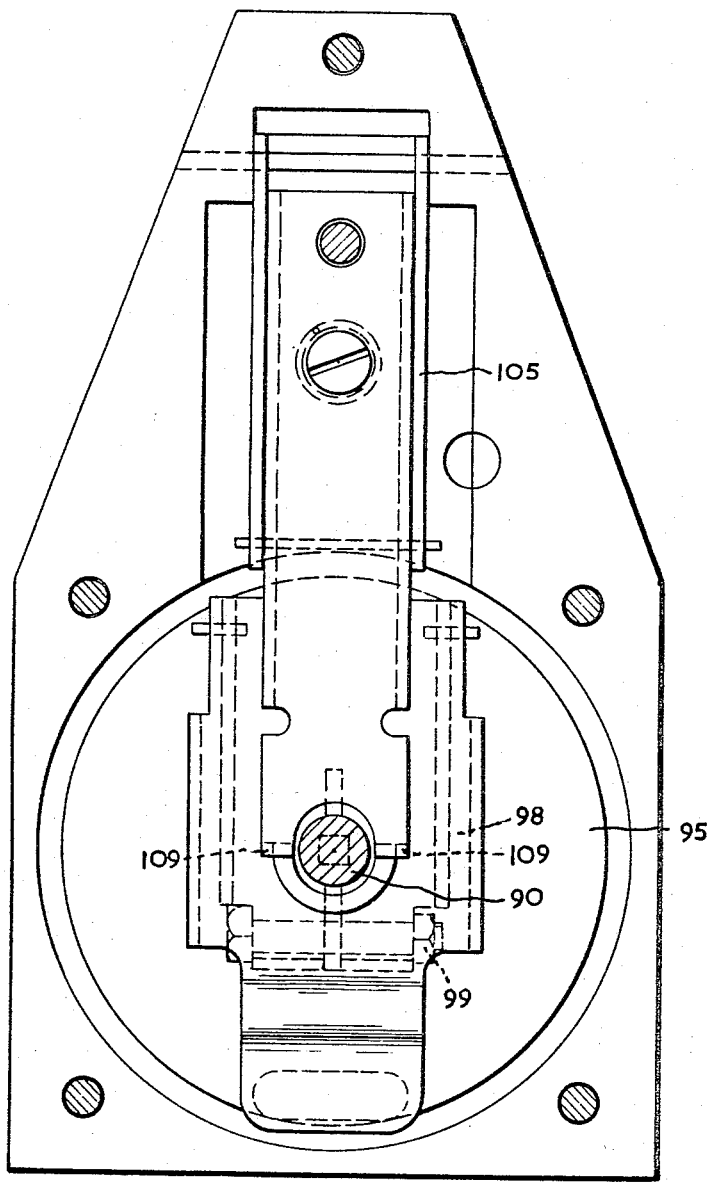

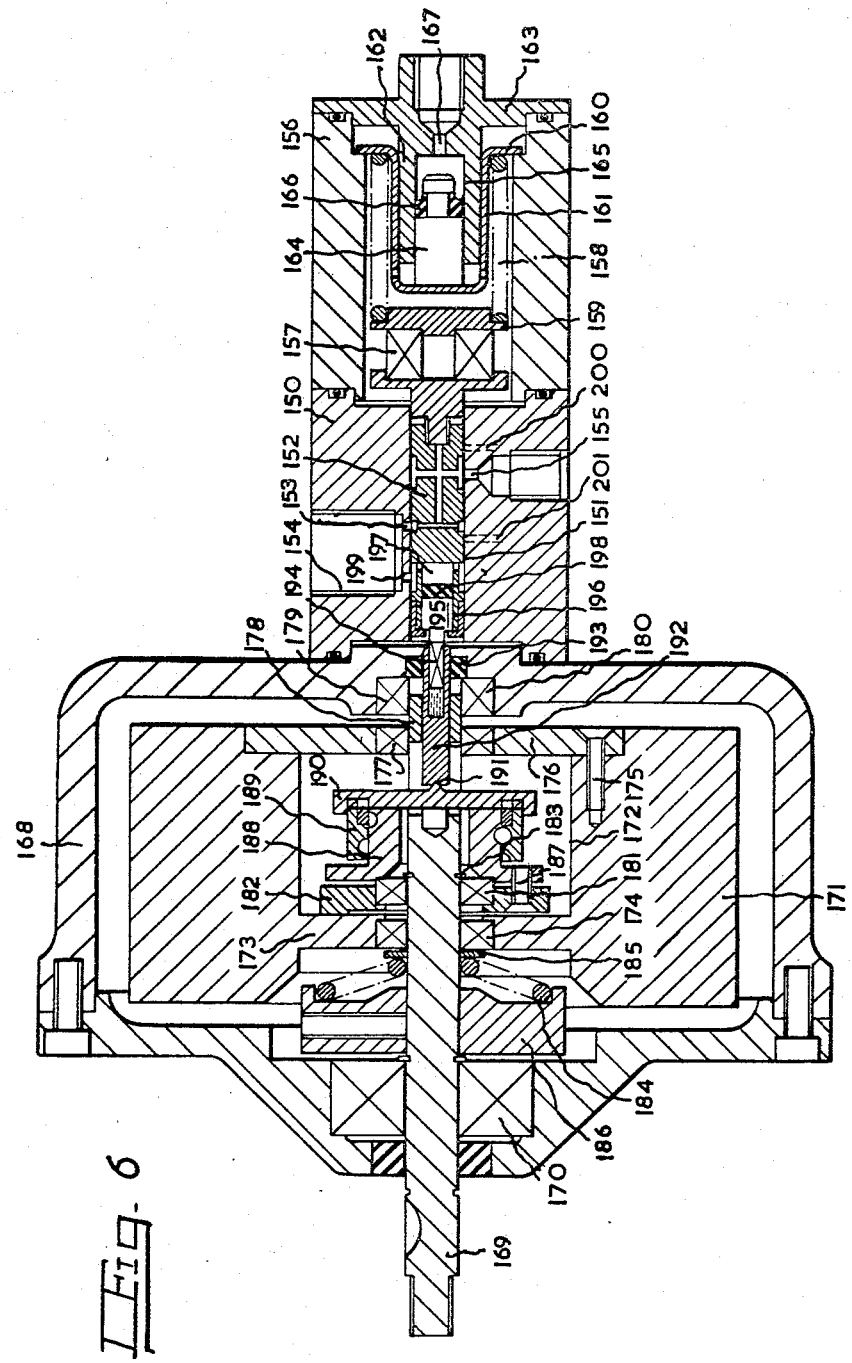

United States Patent Office 3,331,641
Patented July 18, 1967

3,331,641
BRAKE CONTROL SYSTEM
Alexander John Wilson, Sutton Coldfield, England, assignor to Girling Limited, Birmingham, England, a British company
Filed May 28, 1964, Ser. No. 373,599
Claims priority, application Great Britain, June 5, 1963, 8,880/63
3 Claims. (Cl. 303—21)

This invention relates to improvements in vehicle braking systems. In the type of braking system usually employed for motor vehicles it is usual for the load which is applied to the brake operating pedal to be proportional to the load which is applied by the friction means in the vehicle brakes.

Vehicle brakes have been proposed embodying anti-skid devices whereby, in the event of one or more of the road wheels of the vehicle beginning to skid, a correcting device releases the brake until the speed of rotation of the wheel or wheels has had time to increase to a value corresponding to the vehicle road speed. Such devices therefore destroy the relationship between the pedal load and the braking effect applied by the friction means when skidding occurs. Furthermore these antiskid devices generally come into operation only when one or more of the wheels commences, or is about to commence, skidding and consequently may remain unused for long periods. This is an undesirable and potentially dangerous state of affairs since such devices may become inoperative through lack of maintenance or other cause without the driver being aware of the change.

Accordingly we now propose a vehicle braking system in which the brake applying means operates a regulator which is sensitive to the deceleration of one or more of the vehicle wheels.

Preferably where the braking system includes the proposed form of antiskid device it is arranged for this device to control also all normal braking operations so that any faults in this device will quickly become apparent.

According to a feature of the invention it is proposed that the deceleration of one or more of the wheels is sensed by a device which provides a signal proportional to this deceleration and that the brake operating means provides a signal of the same order and type. The operation of the braking system is then controlled by applying the difference between these two signals, connected by suitable means to an operating force, to some or all of the wheels of the vehicle. Alternatively, it may be arranged for the brake pressure to be allowed to increase whenever the operating means signal exceeds the wheel deceleration signal; in this latter case it must be arranged that the brake pressure falls at some controlled rate when the wheel deceleration signal exceeds the operating force signal.

The brakes are thus controlled by the negative feed back of deceleration to a substantial extent during the time when the brakes are being operated.

In braking systems in which the wheel brakes are applied by hydraulic pressure from a high pressure supply through a pedal-operated spool valve or the like it is usual to arrange for the operating force at the brake pedal to be opposed by a force proportional to the hydraulic pressure applied to the brake. The difference between this fluid force and the pedal operating force causes the spool valve or the like to move until the pressure at the brakes is proportional to the operating force at the pedal.

According to a further feature of this invention the oprating force at the pedal is balanced by a force corresponding to the wheel deceleration which may be transmitted by hydraulic or other means. The pedal-operated spool valve or the like is not primarily controlled by the pressure at the brakes although this pressure may be used to stabilize the operation of the control system.

When it is desired to employ direct operation of part of the vehicle braking system and the proposed device for the remainder of the system this may be effected by allowing the proposed device to impose substantial modulation to contain the brake or brakes, while retaining a sufficient element of direct control to ensure that the braking work is divided satisfactorily between the direct and indirectly operated brakes.

Some vehicle braking systems incorporating our invention are illustrated in the accompanying drawings in which:

FIGURE 1 is a layout of one form of braking system;
FIGURE 2 is a layout of another form of braking system;
FIGURE 3 is a layout showing the installation in a vehicle of a further form of braking system;
FIGURE 4 is a longitudinal section through the deceleration sensing unit and relay valve incorporated in the braking system shown in FIGURE 3;
FIGURE 5 is a section substantially on the line 5—5 of FIGURE 4; and
FIGURE 6 is a longitudinal section through another form of deceleration sensing unit.

In the layout shown in FIGURE 1, 10 is a control valve in the cylinder of which works a valve spool 11 adapted to be moved in a direction to uncover a port 12 in the cylinder wall and permit high pressure fluid from a pipe-line 13, connected to any convenient source, to be supplied to wheel cylinders through a port 14 in the cylinder wall and a pipe-line 15. The valve spool is moved in the cylinder to uncover the port 12 by a brake pedal 16 which acts on the valve spool through a mechanical transmission 17. The end of the valve spool remote from the pedal is exposed to fluid pressure which tends to move it in a direction to close the port 12 in opposition to the force exerted by the pedal, this pressure being controlled by means sensitive to the deceleration of the wheel.

In the arrangement shown a branch 18 from the high pressure pipe-line 13 is connected through a normally closed one-way valve 19 to a control chamber 20 in a stationary housing 21. The control chamber 20 is connected through pipe-lines 22 and 23 to a port 24 in the end of the valve cylinder remote from the pedal so that pressure in the control chamber acts on the valve spool in opposition to the force exerted by the pedal. The control chamber 20 has an outlet 25 to drain through pipe-line 25a, and a plunger 26 in sealing engagement with the side of the chamber opposite the one-way valve 19 enters the chamber and has an end 27 of reduced diameter adapted to engage and unseat the valve when the plunger is moved axially by means sensitive to the deceleration of a wheel.

The plunger at its other end is provided with a splined portion 28 slidably engaging in a splined axial bore 29 in one end of a shaft 30 driven by the wheel. An axially fixed flywheel 31 mounted on bearings 32 and 33 on the end of the shaft is driven from the plunger 26 by balls or rollers 34 positioned between an annular flange 35 on the spindle at an intermediate point in its length and an adjacent end face of the flywheel, the balls or rollers cooperating with ramps or recesses in the adjacent faces.

When the brake is applied by operation of the brake pedal 16 moving the valve spool 11 to uncover the port 12, the wheel, the shaft 30 and the spindle 26 are decelerated but the flywheel, due to its inertia, continues to rotate at its original speed and the balls or rollers 34 ride up the ramps or recesses, the spindle 26 being advanced to unseat the one-way valve 19. High pressure fluid enters the control chamber 20 and flows to the control valve 10, where it acts on the valve spool 11 in opposition to the force exerted on it by the brake pedal 16. At the same time the pressure in the control chamber acting on the plunger 26 urges it in the opposite direction to that in which it is moved by its cooperation with the flywheel so that the valve 19 is restored to its closed condition.

Continued rotation of the flywheel is thus resisted by a force proportional to the pressure in chamber 20 acting through the plunger 26, the balls and the ramps, and this force opposing the rotation of the flywheel is chosen to decelerate the flywheel at a rate appropriate to the load on the pedal.

The control chamber comes into operation on each application of brake, and operates continuously while a deceleration is occurring.

When the one-way valve 19 is closed liquid can drain through the restricted outlet from the control chamber and the pipe-lines 22 and 23 connecting it to the control valve 10.

When the brake is released liquid can also drain through a restricted outlet 36 in the control valve through pipe-line 36a and from the pipe-line 15 connecting the control valve to the wheel cylinders.

As the time cycle between the actuation of the pedal 16 and the correction of the pressure by control means sensitive to wheel deceleration can be relatively large means may be incorporated for anticipating the action of the control means. As shown in FIGURE 1 a floating piston 37 is normally held by opposed springs 38 and 39 in a substantially central position in a cylinder 40. One end of the cylinder is connected to the high pressure pipe-line 15 between the control valve 10 and the wheel cylinders through a pipe-line 42, and the other end of the cylinder is connected at the junction of the pipe-lines 22 and 23 between the control chamber 20 and the control valve 10 through a pipe-line 43.

When the port 12 in the cylinder wall of the control valve 10 is opened by operation of the brake pedal 16 the surge of high pressure fluid to the wheel cylinders moves the floating piston 37 axially to displace liquid from the other end of the cylinder to the control valve 10 through the pipe-lines 43 and 23. This pressure acts on the valve spool 11 in opposition to the force exerted by the brake pedal so that there is a preliminary control of the pressure applied to the wheel cylinders before the means sensitive to the wheel deceleration takes over control.

If the deceleration is substantially at a constant rate the floating piston 37 comes to rest and does not influence the balance between the pedal force and the deceleration signal. Sudden changes in either of these operating factors are less liable to introduce any unstable oscillations and irregularities of behaviour due to the anticipating effect of the floating piston 37.

In the layout shown in FIGURE 2, 50 is a control valve in the cylinder of which works a valve spool 51 adapted to be moved in a direction to uncover a port 52 in the cylinder wall and permit high pressure fluid from a pipe-line 53, connected to any convenient source to be supplied to wheel cylinder through a port 54 in the cylinder wall and a pipe-line 55. The valve spool is moved in the cylinder to uncover the port 52 by high pressure fluid from a pedal-operated master cylinder (not shown) which enters the cylinder through pipe-line 57 a port 56 in its end wall and acts on the spool.

The valve spool tends to be moved in a direction to close the port 52 in opposition to the force exerted by the pressure fluid by a direct mechanical connection between the valve and means sensitive to the deceleration of a wheel.

This is achieved in the arrangement illustrated by mounting on the end of the control valve remote from its actuated end the means sensitive to the deceleration of a wheel which comprise a housing 58 bolted at one end on a radially projecting annular flange 59 on the control valve. One end of a shaft 59 entering the housing 58 through the end of the housing remote from the control valve and driven by the wheel is provided with a screw-threaded portion 60 on which is mounted a flywheel 61 provided with an axial bore in screw-threaded engagement with the screw-threaded portion on the shaft. A mechanical thrust member 62 slidably guided in a seal 63 in the end of the control valve 50 adjacent the flywheel engages at one end with the valve spool 51 and at the other end with the end face of the flywheel adjacent to the control valve.

When the brake is applied by operation of the master cylinder moving the valve spool and uncovering the port 52, the wheel and the shaft 59 are decelerated but the flywheel, due to its inertia, continues to rotate at its original speed and unscrews itself from the shaft. The thrust member 62 is then moved axially and applies to the valve spool 51 a force in opposition to the force exerted by the master cylinder.

A balance is thus achieved between the means sensitive to the deceleration of the wheel and the pressure applied to the valve spool by the master cylinder so that this pressure is substantially proportional to the deceleration of the wheel.

When the brake is released liquid can drain through a restricted outlet 64 in the control valve 50 pipe-line 64a and from the pipe-line 55 connecting the control valve to the wheel cylinders.

An anticipator may be incorporated so that there is a preliminary control of the pressure applied to the wheel cylinders before the means sensitive to the wheel deceleration takes over.

The anticipator illustrated at 65 is connected at one end to the pipe-line 55 between the control valve 50 and the wheel cylinders through pipe-line 67. At the other end the anticipator is connected to the port 66 in the control valve between the seal 63 and the adjacent end of the valve spool through pipe-line 68 so that the pressure from the anticipator acts on the valve spool in opposition to the pressure of the liquid from the master cylinder.

The anticipator illustrated is identical to the anticipator incorporated in the embodiment of FIGURE 1 and need not be further described.

Alternatively the anticipator in the embodiments of FIGURES 1 and 2 may comprise a restriction interposed in the pipe-line 15 or 55 and mounted in such a way that the pressure on the two sides of the restriction acts oppositely on areas of the control valve 10, 50. Flow to the brakes produces a pressure drop across the restriction which creates an unbalanced force on the control which urges it in the closing direction against the load from the operating means.

In the braking system shown in FIGURES 3, 4 and 5 brakes on the front wheels 80 and the rear wheels 81 of a vehicle are applied by operation of a pedal-operated master cylinder 82 which supplies direct to wheel cylinders on the front wheels 80 fluid under pressure. Simultaneously the master cylinder 82 supplies fluid to a deceleration sensing unit 83 which actuates a relay valve 84 controlling the operation of a vacuum suspended booster 85. The relay valve and the booster on both sides of its diaphragm are normally connected to a source of vacuum such as the inlet manifold 86 of the vehicle. When the relay valve 84 is actuated the supply of vacuum to one side of the diaphragm of the booster is cut off and air is introduced to that side by the relay valve, the diaphragm moving in a direction to actuate the piston of a master cylinder 87 which supplies fluid to the wheel cylinders on the rear wheels of the vehicle. The sensing unit 83 is connected in the drive between the gear box and speedometer of the vehicle and controls the operation of the booster-operated master cylinder 87 in accordance with a balance achieved between the pressure of the fluid supplied to the sensing unit by the master cylinder 82 and the deceleration of the speedometer drive in accordance with the deceleration of the rear wheels 81 of the vehicle.

The sensing unit 83 and the relay valve 84 are shown in FIGURES 4 and 5, in which the drive from the gear box to the speedometer is in the form of a spindle 90 rotatably mounted in the housing of the sensing unit and supported at opposite ends in seals 91 and 92 fixed in end walls 93 and 94 of the housing. A flywheel 95 is mounted on a bearing 96 on a portion of the spindle adjacent to the end wall 94. The flywheel can rotate on the bearing independently of the spindle but axial movement of the flywheel relative to the spindle is prevented by the engagement of one end of the bearing against a stop collar 97 secured to the spindle. The bearing is held against the stop collar by a member 98 engaging with the other end of the bearing and clamped to the shaft by a bolt 99. The clamping member 98 rotates with the spindle and connected to the clamping member by a pivot 100 is a lever 101 in the free end of which is formed a recess 102.

A ball 103 received in the recess cooperates with an adjacent face on the flywheel and the ball 103 is normally urged into engagement with the flywheel to drive it by a nonrotatable thrust member 104 acting on the lever 101. The thrust member is positioned on the spindle between the lever 101 and the end wall 93 of the housing of the sensing unit.

A lever 105 of generally U-shaped channel section is mounted at its upper end for angular movement about a stationary pivot 106 in the upper end of the housing. A lever 107 of generally U-shaped channel section for substantially the upper part of its length positioned between the side portions of the lever 105 is pivotally mounted at an intermediate point in its length on a cross-pin 108 passing through the side portions of both levers. At its lower end a bifurcated portion 109 on the lever is normally held in engagement with slots in the thrust member 104 by the action of a spring 110 positioned between the levers 105 and 107 above the cross-pin 108. The thrust member normally urges the lever 101 towards the flywheel and the engagement of the bifurcated portion 109 in the slots holds the thrust member against rotation.

Pivotally connected to the base of the channel forming the lever 105 by a pin 111 is the free end of a stem 112 of a valve 113 which controls a passage 114 in the housing of the sensing unit communicating with a passage 115 in the relay valve 84.

The sensing unit is connected to the master cylinder 82 by an externally screw-threaded connection 116 extending outwards from the end wall 93 and fluid from the master cylinder acts on a seal 117 on the outer end of a thrust-rod 118 working in an axial bore 119 in the connection. The thrust-rod at its inner end engages with the lever 107 which, upon actuation of the master cylinder 82, is moved angularly about its pivot 108 which allows lever 105 to move angularly about its fixed pivot 106 to open the valve 113 and allow air to enter the relay valve 84.

In the construction shown the relay valve 84 comprises a valve housing of which the end opposite to the end in which is formed the passage 115 is open to atmosphere through ports 120. A plate valve 121 urged by a spring against an annular seating 122 in the housing normally closes communication between atmosphere and the interior of the housing.

A floating cup-shaped valve member 123 is supported within the housing by spaced diaphragms 124 and 125 of which the space 126 between the diaphragm is connected to the manifold 86 of the vehicle supplying a source of vacuum and the space 127 between the diaphragm 125 and the plate valve is connected to one side of the diaphragm in the booster 85. An orifice 128 in the valve member connects the space between the diaphragms and a space between the diaphragms and an end wall in which the passage 115 is located. A spring 129 normally holds the valve member in the position shown in FIGURE 4 in which it is spaced from the plate valve 121 and the spaces 126 and 127 are in communication through ports 130 in the valve member so that both ends of the relay are under vacuum.

When air is admitted to the housing through the passage 115, the valve member 123 moves to the right and first engages the plate valve 121 to cut off communication between the space 127 and vacuum, and then moves the plate valve away from its seating to connect the space 127 to atmosphere. Air from the space 127 is then supplied to one side of the diaphragm of the booster 85 which is actuated and operates the master cylinder 87 to supply fluid to the wheel cylinders on the rear wheel 81 of the vehicle.

When the brakes on the front and rear wheels of the vehicle are applied normally by operation of the pedal operated master cylinder as described above the front brakes, which in this embodiment are not subjected to deceleration control, are operated directly. Simultaneously a thrust proportional to pressure in the pedal operated master cylinder, is applied to the thrust rod 118. At a relatively low value of thrust the spring 110, which separates levers 105 and 107 collapses, and the air valve 113 opens fully. A thrust proportional to the pressure in the pedal operated master cylinder is applied to the ball 103 through the lever 107 and the recess 102 in its free end.

The form of the recess 102 with which the ball engages is such that the thrust on the recess is capable of allowing the spindle to decelerate the flywheel 95 approximately in accordance with the deceleration expected to be associated with the pedal operated master cylinder pressure. However, the opening of valve 113 produces a rapid deceleration of the wheels 81 through the action of the rear brake which exceeds this deceleration so that the spindle 90 commences to rotate more slowly than the flywheel. The ball 103 due to its cooperation with the recess 102 urges the levers 101, 107 and 105 in a direction in opposition to thrust applied by rod 118, this movement closing the valve 113 and commencing to relieve the braking pressure. By relieving the braking pressure the spindle 90 is allowed to decelerate at a lower rate than that of the flywheel which continues to be subjected to the thrust from the rod 118, so that the valve 113 reopens to allow further braking of the rear wheels to occur.

The thrust applied to the flywheel, due to the pressure from the pedal operated master cylinder 82 acting on the thrust rod 118, maintains the average deceleration of the flywheel at a constant value while the brakes are subjected to a cyclically increasing and decreasing hydraulic pressure. This results in the wheel decelerating, on an average, at the same rate as the rate of deceleration imposed upon the flywheel.

A stop screw 131 screwed in the housing of the sensing unit in alignment with the thrust rod 118 is adjustable to limit the thrust which can be applied to the ball 103 in order to decelerate the flywheel.

This screw is adjusted in a position as to preclude decelerations being imposed on the flywheel which are greater than any chosen limiting value such as that corresponding to 1g wheel deceleration.

The deceleration sensing unit shown in FIGURE 6 is suitable for incorporation in control systems similar to that shown in the layouts of FIGURES 1 and 2 in which high pressure fluid from any convenient source is supplied to wheel cylinders through a control valve operated directly by a pedal or by pressure fluid from a master cylinder.

In the construction illustrated 150 is the housing of the control valve having an axial bore 151 in which works a valve spool 152 adapted to be moved in a direction to uncover a port 153 in the wall of the housing and permit high pressure fluid, from any convenient source connected to the housing by a connection 154, to be supplied to the wheel cylinders through a port 155 and passages in the valve spool.

To one end the control valve housing 150 is secured a hollow sleeve 156 in which is housed a thrust member 157 in screw-threaded engagement at one end with an adjacent end of the valve spool 152. A spring 158 is located between an annular abutment 159 on the end of the thrust member remote from the valve spool and an annular flange 160 on a member 161 of generally "top-hat outline" which is mounted for sliding axial movement on stem 162 projecting inwardly from a closure 163 for the end of the sleeve 156 remote from the valve housing 150. A piston 164 working in an axial bore 165 in the stem 162 is adapted to engage at its inner end with the end of the member 161 and the outer face of an annular seal 166 on the outer end of the piston 164 is subjected to pressure fluid from a pedal operated master cylinder (not shown) which enters the bore 165 through a port 167 in the closure 163.

When the master cylinder is operated the piston 164 is moved axially in the bore 165 and moves with it the member 161 which applies to the thrust member 157, through the spring 158, a force moving the valve spool valve 152 in the bore 151 to uncover the port 153 and permit high pressure fluid to be supplied to the wheel cylinders. The end of the valve spool remote from the master cylinder is subjected to a force which tends to move it in a direction to close the port 153 in opposition to the force exerted due to fluid applied by the master cylinder, this force being controlled by means sensitive to the deceleration of the wheel.

In the arrangement shown, there is mounted on the end of the control valve housing 150 remote from the sleeve 156, a stationary housing 168 in which is located the means sensitive to the deceleration of the wheel. An axially fixed spindle 169 connected to and driven by the drive from the gear box of the vehicle to the speedometer is rotatably mounted in a bearing 170 in the end wall of the housing 168 remote from the control valve housing 150. The spindle extends into the housing for a substantial distance and a flywheel 171 is rotatably mounted on the spindle within the housing. The flywheel is formed with an axial bore 172 of substantial diameter and at or adjacent the end of the bore adjacent to the end wall of the housing remote from the control valve there is formed integral with the flywheel an inwardly directed annular flange 173 which is mounted on a bearing 174 on the spindle. Detachably secured to the flywheel at its end adjacent to the control valve by bolts 175 is an annular plate 176 mounted on a bearing 177 which is supported on an axially short shaft 178 rotatably mounted in a bearing 179 fixed in an annular recess 180 in the end wall of the casing 168.

Rotatably mounted on a bearing 181 on the spindle within the bore 172 in the flywheel is a ring 182 which is in frictional engagement with the inner face of the flange 173. The bearing 181 is held against a stop collar 183 fixed on the spindle by the action of a spring 184 positioned between a thrust plate 185, engaging with the outer face of the bearing 174, and a member 186 clamped to the spindle. Secured to the ring 182 on its inner face by bolts 187 is a sleeve 188 surrounding the spindle at its inner end. The outer surface of the sleeve 188 is provided with a fast screw-thread with which engages a corresponding screw-thread formed on the inner surface of a cooperating sleeve 189 of which the inner end is provided with a closure 190. On the closure 190 is formed an axially projecting portion 191 formed into a point and engaging with the outer end of a thrust-rod 192 guided for sliding axial movement in a bore in the short shaft 178 and a seal 193 in the end wall of the housing 168 adjacent to the central valve housing 150. At its inner end the thrust-rod 192 is provided with an axial bore in which is received the outer end of a piston rod 194 carrying at its inner end a piston 195 slidably guided in member 196 fixed in the bore 151 of the control valve housing 150. The thrust-rod 192 at its outer end is normally held in engagement with the point 191 on the closure member 190 by high pressure fluid entering a chamber 197 formed in the bore 151 between a seal 198 slidably mounted in the member 196 and engaging with the inner end of the piston 195 and the adjacent end of the valve spool 152. The high pressure fluid enters the chamber 197 through a port 199 in the control valve housing 150 communicating with the connection 154.

When the wheels are rotating normally the flywheel is driven with the spindle 169 by its cooperating with the spring loaded thrust plate 185 and the thrust member is held in engagement with the point 191 on the closure 190 by the high-pressure fluid as described above.

When the master cylinder is operated high pressure fluid is supplied to the wheel cylinders as described above, the wheel and the spindle 169 are decelerated but the flywheel, due to its inertia, continues to rotate at its original speed and the sleeve 189 is unscrewed from the sleeve 188 by the operation of the fast thread. The thrust member 192 is moved towards the valve spool 151 and the fluid in the chamber 197 exerts on the valve spool a force in opposition to the force exerted by the master cylinder.

A balance is thus achieved between the means sensitive to the deceleration of the wheel and the pressure applied to the valve spool 152 by the master cylinder so that this pressure is substantially proportional to the deceleration of the wheel.

When the brake is released fluid can drain from the connection between the control valve and the brakes through a restricted outlet 200 communicating with the bore 151.

If the high pressure supply fails for any reason, such as failure of a pump supplying the high pressure fluid, the thrust member 192 moves out of engagement with the closure 190 for the sleeve 189 and the means sensitive to deceleration of the wheel is rendered inoperative. The brakes are then applied by a bleed from the master cylinder connected to the control valve through an inlet port 201 which is placed in communication with the outlet port 155 to the wheel cylinder through the passage in the valve spool 152 when the valve spool is moved axially in the bore by normal operation of the master cylinder.

In all of the embodiments described above we have arranged that the means sensitive to deceleration is operative on every brake application and wheel deceleration to apply to the brake-operating means a force or pressure substantially proportional to the deceleration of the wheel and which opposes the brake-applying force. This force or pressure is applied irrespective of the rate of deceleration of the wheel.

In all of the embodiments described above we have arranged that the brake pressure is regulated by both the input requirement of the driver and the resulting deceleration of the wheel such that only such torque as may be reasonably applied to the wheel to obtain the required deceleration can be imposed, and it is not possible to obtain an abrupt locking of the wheel through the rapid application of the brake control.

With this system it is still possible for the driver to demand say a 1g stop under conditions which only allow ½g to be obtained and it may be desirable also for the device to be made sensitive to the actual deceleration of the vehicle. This may be done by regulating to a fixed small value in excess of the actual vehicle deceleration the maximum input signal to the control regulator. It is however anticipated that regulators of the type described will generally operate in an oscillatory way and there will be an opportunity during each cycle of oscillation for the flywheel which represents a vehicle deceleration datum to become speeded up in proportion to the actual vehicle speed so that the operation of a brake control of the type described functions as an anti-skid device of the type well known to those skilled in this art.

It will be appreciated that in our invention we provide a vehicle braking system in which the braking torque is regulated by a feedback deceleration of one or more of the vehicle wheels and more particularly the torque is regulated by the deceleration of any combination of the vehicle wheels in accordance with the control signal which is applied by the driver. Thus the brake applying means produces a substantially proportional deceleration of one or more of the vehicle wheels by the use of a continuously operating device or continuously operating device which controls the torque applied to any combination of brakes.

The vehicle brakes are thereby regulated in accordance with the difference or ratio of the brake controlling element and the actual deceleration which the wheel achieves and the braking torque is regulated by negative feedback of wheel deceleration.

I claim:

1. A vehicle braking system incorporating a brake on at least one wheel of the vehicle and including a booster-operated master cylinder to apply the brake, a relay valve to actuate said booster-operated master cylinder, a sensing unit for controlling operation of said relay valve, a pedal-operated master cylinder for actuating said sensing unit, said sensing unit including a housing, and an axially movable thrust rod having first and second opposite ends, fluid pressure from said pedal-operated master cylinder acting on said first end, a first lever at a first end acted upon by the second end of said thrust rod, a fixed pivot in said housing, a second lever mounted for angular movement about said fixed pivot, a pivotal connection between said first lever and said second lever and about which said first lever is angularly movable, and a valve for controlling operation of said relay valve actuated by angular movement of said second lever about said fixed pivot, means sensitive to the deceleration of said wheel adapted to move said first lever angularly in a direction opposite to that in which it is moved by the force applied through said thrust-rod to oppose the force applied to said thrust-rod by said pedal-operated master cylinder, and a spring interposed between said first lever and said second lever to urge said first lever at an end opposite to said first end into engagement with said deceleration sensitive means.

2. A vehicle braking system as claimed in claim 1 wherein said deceleration sensitive means comprise a spindle rotatably mounted in the housing of said sensing unit and adapted to be driven by said wheel, a flywheel rotatably mounted on said spindle, a member fixed to and rotatable with said spindle, a third lever pivotally connected at one end to said member, a recess in the third lever in its opposite end, and a ball located in said recess and a thrust member normally urging said ball into engagement with an adjacent face of said flywheel by the first lever at an end remote from said first end acting on said thrust member.

3. A vehicle braking system as claimed in claim 1, wherein said relay valve comprises a housing open having a front end and a rear end, said front end being open to atmosphere and said rear end including an opening for the admission of air, a valve adapted to be actuated by said sensing unit to control said opening, a cup-shaped spring-loaded valve member in said housing having an orifice in its rear end, spaced diaphragms supporting said valve member in said housing, said housing having a part between the diaphragms in communication with the interior of said valve member and adapted to be connected to a source of vacuum, an annular seating in said housing forward of said valve member, said housing having a part between said seating and the forward diaphragm adapted to be connected to said booster of said booster-operated master cylinder, and a spring loaded plate valve normally held in engagement with said annular seating, admission of air through the opening in the rear end of the housing causing the valve member to move forwardly into engagement with said plate valve to cut off communication between the source of vacuum of the booster and to move the plate valve away from its seating to connect the booster to atmosphere.

References Cited

UNITED STATES PATENTS

| 2,073,163 | 3/1937 | Martin | 303—24 X |
| 2,868,338 | 1/1959 | Lucien et al. | 188—181 |
| 3,005,664 | 10/1961 | Hoover | 303—24 |
| 3,099,499 | 7/1963 | Parshall | 303—21 |
| 3,184,269 | 5/1965 | Hager | 303—24 X |

FOREIGN PATENTS 1,063,465  8/1959  Germany.

EUGENE G. BOTZ, *Primary Examiner.*